United States Patent
Sundaresan et al.

(10) Patent No.: US 9,473,504 B2
(45) Date of Patent: Oct. 18, 2016

(54) ROLE BASED ACCESS CONTROL FOR CONNECTED CONSUMER DEVICES

(71) Applicant: Ayla Networks, Inc., Sunnyvale, CA (US)

(72) Inventors: Sudha Sundaresan, San Jose, CA (US); Adrian Caceres, Los Gatos, CA (US); Matias Blanch, Buenos Aires (AR)

(73) Assignee: Ayla Networks, Inc., Sunnyvale, CA (US)

( * ) Notice: Subject to any disclaimer, the term of this patent is extended or adjusted under 35 U.S.C. 154(b) by 8 days.

(21) Appl. No.: 14/515,252

(22) Filed: Oct. 15, 2014

(65) Prior Publication Data
US 2016/0112429 A1    Apr. 21, 2016

(51) Int. Cl.
*H04L 29/06* (2006.01)
*H04W 12/06* (2009.01)
*H04W 12/08* (2009.01)

(52) U.S. Cl.
CPC ............ *H04L 63/102* (2013.01); *H04L 63/08* (2013.01); *H04W 12/06* (2013.01); *H04W 12/08* (2013.01)

(58) Field of Classification Search
CPC ............ G06F 21/6218; G06F 21/604; H04L 63/105; H04L 63/08; H04L 63/0807; H04L 63/0815; H04L 63/102
USPC ...................... 726/4–6, 28–30; 707/783–786
See application file for complete search history.

(56) References Cited

U.S. PATENT DOCUMENTS

| | | | |
|---|---|---|---|
| 7,024,548 B1 | 4/2006 | O'Toole, Jr. | |
| 7,546,630 B2 * | 6/2009 | Tabi ..................... | G06F 21/6227 726/2 |
| 7,685,206 B1 * | 3/2010 | Mathew ................ | H04L 63/105 707/785 |
| 8,695,872 B2 * | 4/2014 | Braunstein ........... | G06Q 10/087 235/379 |
| 2003/0105742 A1 | 6/2003 | Boreham et al. | |
| 2003/0105862 A1 | 6/2003 | Villavicencio | |
| 2005/0257055 A1 | 11/2005 | Anderson | |
| 2008/0195741 A1 | 8/2008 | Wynn et al. | |
| 2012/0324592 A1 * | 12/2012 | Korablev ............ | G02F 21/6218 726/30 |
| 2013/0254848 A1 * | 9/2013 | Ge ........................ | G06F 21/335 726/4 |
| 2015/0200964 A1 * | 7/2015 | Kariman ................ | H04L 63/20 726/3 |

OTHER PUBLICATIONS

Security service adaptation for embedded service systems in changing environments, Illner et al, IEEE, 2004.*
Design and implementation of embedded indoor intelligent temperature control system, Xin-chun et al, IEEE, 2010.*
International Search Report and Written Opinion of the International Searching Authority for PCT Application PCT/US15/47283 dated Nov. 30, 2015.

* cited by examiner

*Primary Examiner* — Bradley Holder
*Assistant Examiner* — Jahangir Kabir
(74) *Attorney, Agent, or Firm* — Lowenstein Sandler LLP

(57) ABSTRACT

A processing device authenticates a computing device of a user to a user account. The processing device determines a role associated with the user account, and additionally determines access permissions to one or more resources based on the role. The processing device then grants to the computing device access to the one or more resources to be protected in an internet of things (IoT) solution.

20 Claims, 11 Drawing Sheets

ROLE BASED ACCESS CONTROL FOR CONNECTED CONSUMER DEVICES

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Moreover, access control for most devices that include embedded systems is hard coded into the embedded system and is inflexible. At design time a manufacturer typically sets up a single access policy for an embedded system, and that single access policy persists for the life of the device for all users regardless of who they are.

BRIEF DESCRIPTION OF THE DRAWINGS

Reference will now be made to the accompanying drawings showing example embodiments of the present application, and in which.

DESCRIPTION OF EXAMPLE EMBODIMENTS

The Internet of Things (IoT) evolution has enabled consumers and original equipment manufacturers (OEMs) to interact with their connected devices in unprecedented ways. Consumers who buy connected devices expect to be able to control their devices in a secure manner. They should also be able to share their devices with their friends and family, while still maintaining control over how and when their devices are accessed. For OEMs building connected devices, obtaining data from their devices offers a wealth of information. Typical use cases include analytics, auditing and troubleshooting. Due to the large number of different entities who may request access to network-connected devices and their varying needs, it is beneficial to provide different levels of access based on an entity's role (e.g., within a company, in a residence, etc.). Additionally, for legal, privacy and safety reasons, it is important for access control policies to be enforced while users interact with their devices.

Embodiments are directed to a network-connected device platform (also referred to as an internet-of-things (IoT) cloud platform or simply an IoT platform) that provides flexible control of access to network-connected devices and other resources. The IoT platform generates roles and assigns the roles to user accounts. Each role grants a user account access to a set of resources. Examples of roles include an end-user or consumer role, an original equipment manufacturer (OEM) administrator role, an OEM account manager role, a dealer role, a technician role, and so forth. An OEM administrator role may have access to all OEM user profiles of an organization and end user profiles of those who are consumers of the OEMs products. A dealer role may have access to a consumers profile and other information if the consumer grants the dealer access. Resources may be network-connected devices, attributes or parameters of network-connected devices, other users, and so on. The IoT platform may at any time generate new roles with a unique set of permissions to resources and apply the new roles to an existing set of resources that are in the field (e.g., that have already been sold to consumers). Accordingly, embodiments provide a flexible framework for managing access to resources, and in particular to network-connected devices such as embedded systems.

In one embodiment, a processing device authenticates a computing device of a user to a user account. The processing device determines a role associated with the user account, wherein the role controls access permissions to one or more resources, the one or more resources comprising one or more network-connected devices. The processing device provides a token to the computing device, the token usable to determine the role associated with the user account. The processing device or another processing device, system or service then grants to the computing device access to the one or more resources based on the token.

Figure 1:
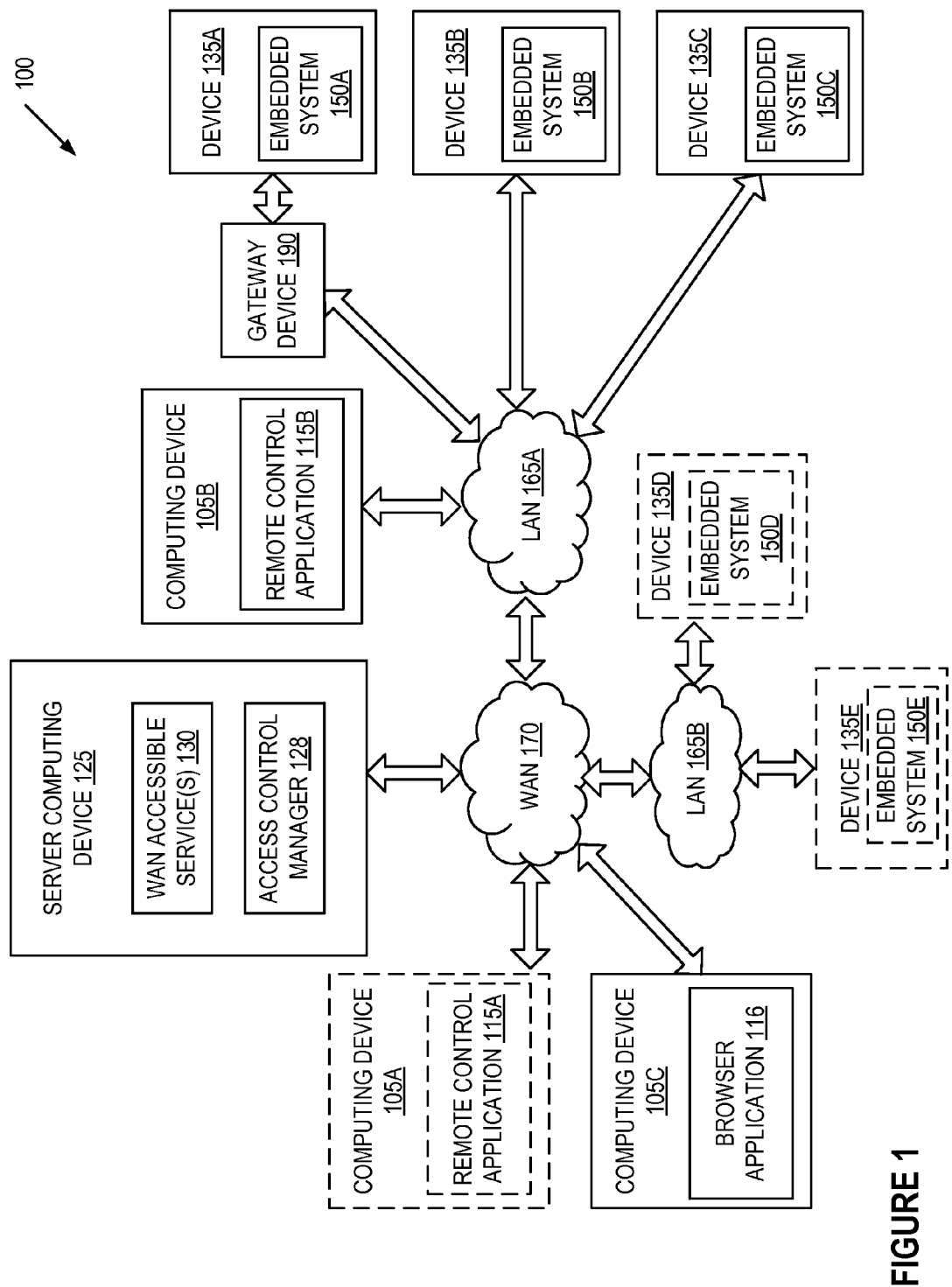
FIG. 1 is a block diagram depicting an example network architecture.

Referring now to the figures, FIG. 1 is a block diagram depicting an example network architecture 100 including remotely accessible embedded systems and computing devices that interact with the embedded systems. The network architecture 100 includes multiple devices 135A-C and a computing device 105B connected to a local area network (LAN) 165A. The network architecture 100 further includes devices 135D-E connected to another LAN 165B. The devices 135A-E are devices with embedded systems 150A-E, and may include, for example, electrical appliances such as refrigerators, ovens, washers, driers, dishwashers, thermostats, alarms, air conditioners, televisions, radios, receivers, amplifiers, and so forth. The devices 135A-E may also include consumer devices such as digital watches, music players, game consoles, digital cameras, printers, and so forth. Other examples of devices 135A-E include stationary devices such as HVAC systems, traffic lights, factory controllers, signs, electronic billboards, sprinkler systems, and irrigation control systems, as well as medical devices. Devices 135A-E may also be any other type of device that includes an embedded system.

An embedded system 150A-E is a class of computing device that is embedded into another device as one component of the device. The device 135A-E typically also includes other hardware, electrical and/or mechanical components that may interface with the embedded system 150A-E. Embedded systems 150A-E are typically configured to handle a particular task or set of tasks, for which the embedded systems 150A-E may be optimized. Accordingly, the embedded systems 150A-E may have a minimal cost and size as compared to general computing devices.

The embedded systems 150A-E may each include a communication module (not shown) that enables the embedded system 150A-E (and thus the device 135A-E) to connect to a LAN 165A, 165B or to a wireless carrier network (e.g., that is implemented using various data processing equipment, communication towers, etc.). The communication module may be configured to manage security, manage sessions, manage access control, manage communications with external devices, and so forth. In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology. One example of an embedded system is described in greater detail below with reference to FIG. 8.

Referring back to FIG. 1, the LANs 165A, 165B may each include a router, switch, bridge or other network device (not shown) that enables communication between multiple devices connected to the LAN 165A, 165B. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-E may not support any of the communication types supported by the network device. For example, device 135A may support Zigbee, and device 135B may support Bluetooth. To enable such devices to connect to the LAN 165A, the LAN 165A may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices may connect to the LAN 165A through the gateway device 190.

The LANs 165A, 165B (or wireless carrier) are connected to a wide area network (WAN) 170. The WAN 170 may be a private WAN (e.g., an intranet) or a public WAN such as the Internet, or may include a combination of a private and public network. The LANs 165A, 165B may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-E. Alternatively, the WAN accessible service 130 may periodically establish sessions with the embedded systems 150A-E. Via a session with an embedded system 150A-E, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-E may identify values or states of some or all detectable parameters of devices 135A-E that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-E by the WAN accessible service 130 and/or by computing devices 105A-B. By maintaining or periodically establishing sessions with the embedded systems 150A-E, the WAN accessible services 130 may maintain up-to-date information on the states of the devices 135A-E.

Computing devices 105A-B may include portable devices such as electronic book readers, portable digital assistants, mobile phones, laptop computers, portable media players, tablet computers, cameras, video cameras, netbooks, notebooks, and the like. Computing devices 105A-105B may also include traditionally stationary devices such as desktop computers, gaming consoles, digital video disc (DVD) players, media centers, and the like. Computing devices 105A-B may connect to the WAN 170 and/or to the LANs 165A-B.

Computing devices 105A-C may include a remote control application (or multiple remote control applications) 115A-B that can receive information for devices 135A-E and control the devices 135A-E. The remote control application 115A-B is configured to interface with and/or control one or more of the devices 135A-E via the devices' embedded systems 150A-E. The remote control application 105A-E may be programmed to run on various operating systems, such as Windows® operating systems, Unix® operating systems, iOS® operating systems, Android® operating systems and Java® operating systems to name a few. The remote control application 105A-B may also be configured as firmware, or as hardware, or as some combination of software, firmware and/or hardware. The remote control application 105A-B may include a graphical user interface (GUI) that enables users to interact with and control devices 135A-E in an intuitive and user-friendly manner. A user may interact with the GUI to cause the remote control application to generate notifications, commands, property updates and other messages for the devices represented in the GUI.

In one embodiment, the computing devices 105A-B include separate remote control applications for each of the embedded systems 150A-E. Alternatively, the computing devices 105A-B may include a single remote control application that is capable of communicating with and controlling embedded systems 150A-E for multiple different devices 135A-E.

While computing devices 105A-B are connected to WAN 170 or directly to a LAN 165A-B, a remote control application 115A-B may establish a session with the WAN accessible service 130. The WAN accessible service 130 may provide an interface for indirectly controlling and monitoring one or more of the devices 135A-E.

Server computing device 125 includes an access control manager 128 that performs authorization and authentication of remote control applications 115A-115B. Access control manager 128 additionally manages roles and assigns roles to user accounts. Each role provides a set of permissions or privileges with regards to one or more resources (e.g., to one or more devices 135A-E, one or more user resources, etc.). Once a remote control application 115A-B successfully completes authentication (e.g., by providing proper credentials to the access control manager 128), the access control manager 128 generates a token and provides the token to the remote control application 115A-B. The remote control application 115A-B may then provide the token to one or more WAN accessible services 130 to gain access to resources such as devices 135A-135E.

Responsive to receiving a token from a remote control application 115A-115B, the WAN accessible service 130 determines a role (or roles) of a user account associated with the remote control application based on the token. This indicates to the WAN accessible service 130 what resources the remote control application 115A-B should have access to. WAN accessible service 130 may then provide information and controls for one or more devices 135A-E and/or access to one or more user resources in accordance with the determined role or roles.

For example, a role associated with a user account may include permissions to control a state of device 135A. If a user desires to change a state of device 135A, the user may issue a command via the remote control application 115A, and that command may be sent to the WAN accessible service 130. The WAN accessible service 130 may then forward the command on to the appropriate embedded system for execution.

The role associated with the user account may additionally include permissions to view state information of the device 135A. Accordingly, when the WAN accessible service 130 receives updated state information for device 135A from embedded system 150A, the WAN accessible service 130 may forward the state information on to the remote control application 115A. Thus, based on his assigned role a user may be able to connect to, view status information for, and control the devices 135A-E from anywhere he has access to the Internet. The role of the user account may additionally include permissions to access user resources (e.g., information about particular users or a particular class of users).

In an example, remote control application 115A may be associated with a first user account having a first role, and remote control application 115B may be associated with a second user account also having the first role. Additionally, computing device 105C may connect to WAN accessible services 130 using a browser application 116 such as Chrome®, Internet Explorer®, Safari®, and so on. Alternatively, computing device 105C may connect to the WAN accessible services 130 via an agent (not shown) that is configured to interface with the WAN accessible services 130. The browser application 116 or agent may be associated with a third user account having a second role.

Continuing the example, the first user account associated with remote control application 115A may be associated with an end-user or owner role and may have access to current status information and control of devices 135D-135E, all of which may be owned by a user of computing device 105A. However, the user may not own devices 135A-C, and so the role may not have access to view or control these devices. The second user account associated with remote control application 115б may be associated with the owner role and thus have access to view devices 135A-C that are owned by the second user.

The third user account associated with computing device 105C may be associated with an OEM role of a manufacturer of some or all of the devices 135A-135E. In this example, assume that devices 135A, 135б, 135D and 135E were all manufactured by the OEM associated with the OEM role. Thus, the third user account may have access to analytical information, debug information, fault information, statistics, etc. on devices 135A, 135б, 135D and 135E. This information may be anonymized to ensure privacy of the device owners. Such data may or may not be available to the end-users who own these devices (e.g., to the first role). However, the OEM role may not have access to control the devices. Accordingly, the permissions of each of the roles may be slightly to drastically different, providing different levels of permissions and to different sets of devices.

The WAN accessible services 130 and access control manager 128 may be components of an IoT platform that OEMs can leverage to quickly and easily create new network-connected device products. The IoT platform will handle authorization and authentication, network connection, information gathering and analytics, device management, role based access control and more. The access control manager 128 of the IoT platform provides a framework for setting up and managing roles, user accounts and resources to enable flexibility in managing devices and access to device information.

Figure 2A:
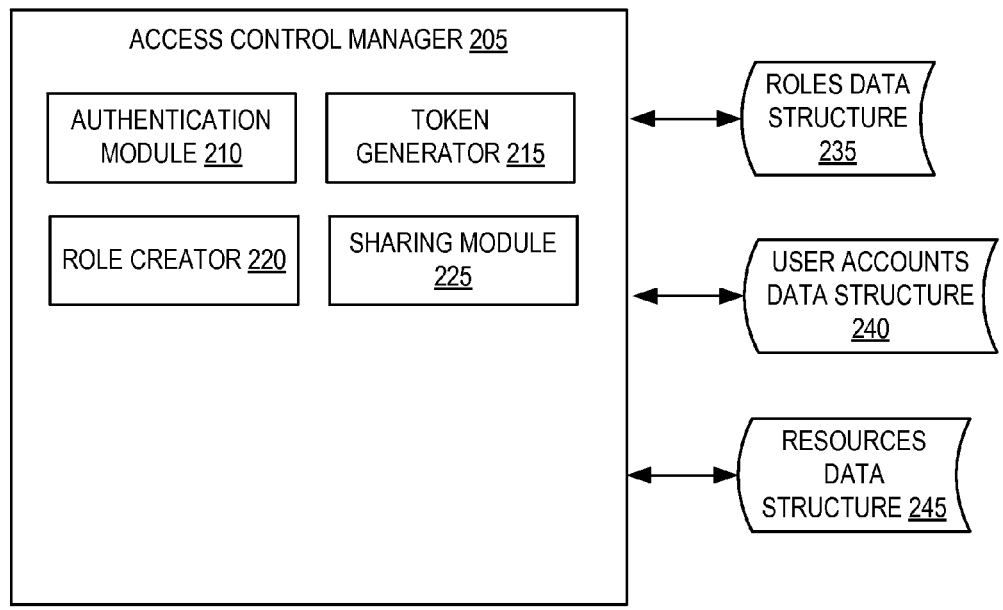
FIG. 2A is a block diagram of an example embodiment of an access control manager.

FIG. 2A is a block diagram of an example embodiment of an access control manager 205, which in one embodiment corresponds to access control manager 128 of FIG. 1. Access control manager 205 may include an authentication module 210, a token generator 215, a role creator 220, and a sharing module 225. Alternatively, the functionality of one or more of the authentication module 210, token generator 215, role creator 220 and/or sharing module 225 may be combined into a single module or divided into multiple sub-modules.

Access control manager 205 maintains a roles data structure 325, a user accounts data structure 240 and a resources data structure 245. Each of the data structures 235-245 may be a separate table, spreadsheet, database, or other data structure. Alternatively, the data structures 235-245 may be combined into a single data structure.

Resources data structure 245 includes entries for every resource. Examples of resources include devices, users, firmware images, device templates, and so forth. Device resources may include particular devices and/or components, attributes, settings, parameters, data, etc. of particular devices. User resources may include user account information, user demographic information, user behaviors, user purchase history, user historical data, and so forth. Additionally, user resources may be grouped based on OEM, based on divisions within an OEM, based on dealer, or in other ways. Some access control privileges may be to specific groups of user resources (e.g., to all user resources associated with an OEM). A device template is a model of a device that captures the physical and behavioral attributes of the device. Some resources may have sub-resources, which may be hierarchically arranged. For example, device resources may have sub-resources for settings/parameters, OEM data (e.g., including analytical, trace, statistical and other data that might not be provided to end users), user data, and so on. User resources may have sub-resources for different types of user data, such as user address, user phone number, user owned devices, etc.

Figure 2B:
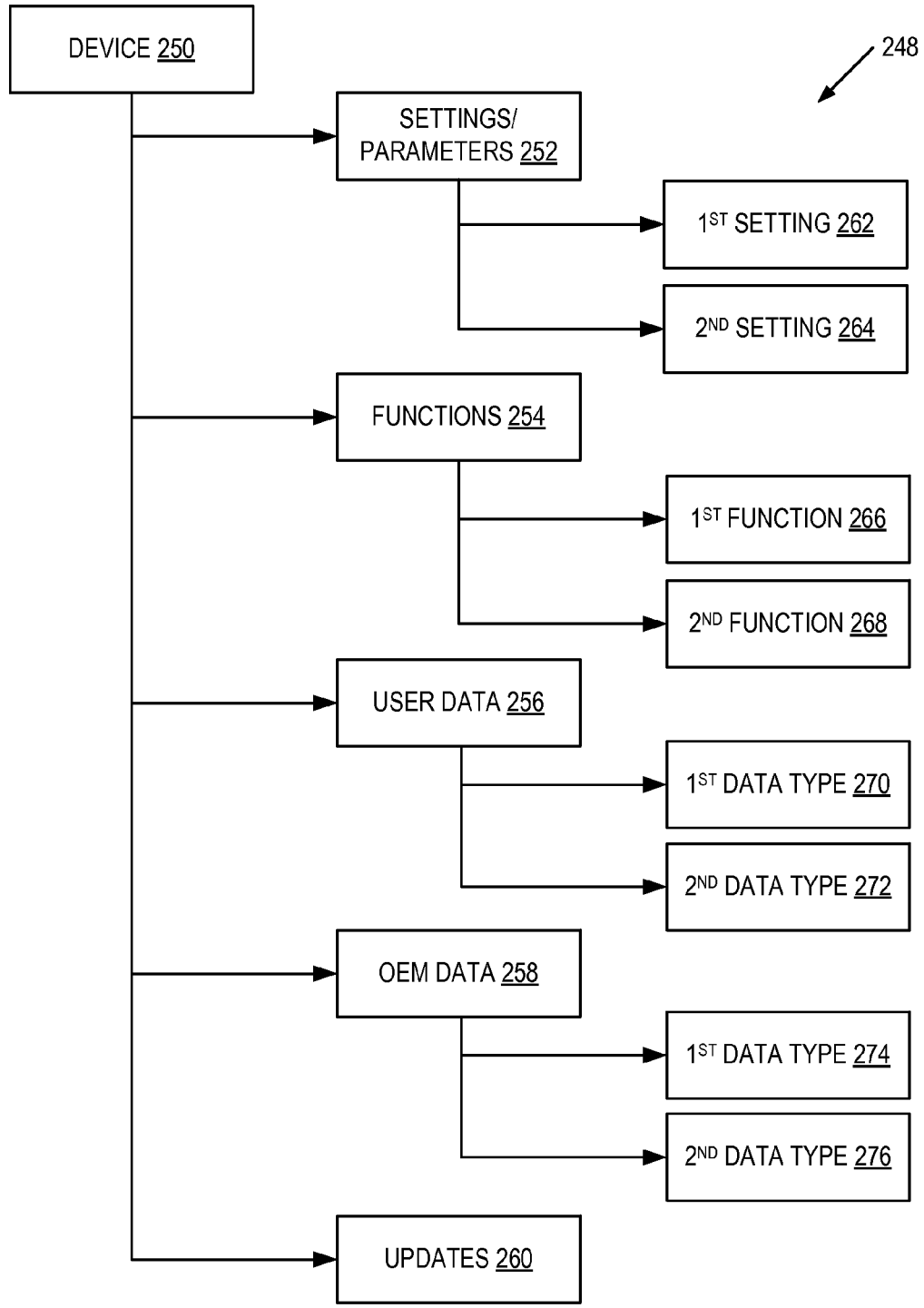
FIG. 2B illustrates an example resource hierarchy for a device resource.

FIG. 2B illustrates an example resource hierarchy 248 for a device resource 250. The device resource 250 may include sub-resources of settings/parameters 252, functions 254, user data 256, OEM data 258 and updates 260. The setting/parameters sub-resource 252 further includes a first setting 262 and a second setting 264. The functions sub-resource 254 further includes a first function 266 and a second function 268. The user data sub-resource 256 further includes a first user data type 270 and a second user data type 272. The OEM data sub-resource 258 further includes a first user data type 274 and a second user data type 276. In other examples more, fewer, and/or different sub-resources may be used. Access to each of these sub-resources may be controlled at any desired level of granularity.

The device resource 250 may be associated with one or more tags. Each tag may represent one or more attributes that are used to determine which roles have access to the device resource 250 and/or sub-resources as well as the level of access (e.g., read or write access). The tags may have fixed values, or may have dynamic values that vary based on conditions.

In an example, the device may include an environment tag, which may be changed based on whether the device 250 is at a manufacturer, has been shipped to a dealer or distributor, or has been purchased by an end-user. The environment tag may have a residential environment value when the device is registered by an end user, an enterprise environment value before the device is shipped to a retailer or dealer, and a commercial environment value after the device has been shipped to a dealer or retailer, for example.

In another example, the device 250 may have a location tag that may change based on a location of the device 250. For example, a value of the location tag may automatically update based on an internet protocol (IP) address of the device. The device may also include a model tag (e.g., HVAC, watch, etc.), which may be fixed. The device 250 may also include a proximity tag that may indicate a proximity of a remote control application or other device to enable access. For example, a proximity tag may indicate that a mobile device with a remote control application is on a same LAN as the device, or that the mobile device is paired with the device via Bluetooth. Any of these or other tags may be used to determine privileges to access resources.

Multiple different tags may be associated with the device 250. Additionally, one or more of the sub-resources may also be associated with tags. These tags may be used to determine which roles have access to specific sub-resources.

Referring back to FIG. 2A, the roles data structure 235 contains an entry for each role. Each role may have a unique set of privileges for accessing resources. In one embodiment, each role includes one or more tags, each of which may be associated with one or more resources. The tags may have fixed or variable values. In one embodiment, in order for a role to have a privilege to access a resource, a value of a tag associated with that role should be equal to a value of a similar tag associated with the resource. For example, if a tag associated with a role is location=North America, then that role has a privilege to access resources that are located in North America. Tags may similarly be used to restrict access to resources by remote control applications running on mobile devices that are on a same LAN as a device, for example.

Each OEM may have its own subset of roles associated with that OEM. Each OEM will have an OEM administrator role that may have all privileges associated with devices manufactured by that OEM, including privileges to create new roles. In one embodiment, the OEM administrator role does not have privileges to view user data for, or control, network-connected devices of end-users.

The access control manager 205 may manage roles, resources and user accounts for multiple different OEMs, dealers, suppliers, customers, and so on. Each OEM may have a different organizational structure and/or sales channels, and may set up a different role hierarchy that may be specific to that OEM and apply to the resources associated with that OEM (e.g., to devices manufactured by that OEM and customers of that OEM). Access control manager 205 managers roles, resources and user accounts in a flexible manner that can be adapted to any use case, addressing both enterprise and consumer concerns.

Access control manager 205 provides granular and flexible controls over which users can have access to what resources as well as the level of access at any desired level of granularity. Each of the roles may have very granular access to one or more resources based on a rule or set of rules set up by an administrator. For example, within a device there may be several options such as viewing data, changing settings, programming the device, and so on. A customer role might have privileges to change the settings (e.g., change a temperature of a thermostat) but not have access to program the device. A dealer role might have privileges to program the device, but not to change settings of the device.

The user accounts data structure 240 includes an entry for each user account. User accounts may include information such as user preferences/settings, user information, user authorization and authentication data (e.g., name and password, biometric data, etc.), devices owned by users, and roles associated with the users.

Role creator 220 creates new roles. A user account with role creation privileges may create a new role. For example, an OEM administrator role has role creation privileges. A device owner role (customer role) may also have role creation privileges (e.g., to create roles for children in the owner's household). A user account with an OEM administrator role may generate any number of roles that will provide any level of privileges with regards to devices manufactured by that OEM. The OEM administrator (or other role creator) may define which resources and sub-resources (e.g., attributes and properties of a resource) can be accessed, and whether they can be accessed for read or write actions. For example, an OEM administrator may generate one or more end-user (also referred to as customer or owner) roles, OEM case manager roles, technician roles, dealer roles, and so forth. Different OEMs will likely have different sets of roles, which may have different permissions.

When a new role is to be created, the creator of the new role can give to the new role any privileges that the creator has. For example, an OEM administrator can grant any privileges for devices manufactured by the OEM and for any customers of the OEM. However, an OEM administrator would be unable to grant permissions to devices of another OEM when the OEM administrator generates a new role.

In a company, organizations may be structured using various criteria such as product responsibility, location, and so on. Access control manager 205 enables roles to be created based on an organizational structure of a company that enable employees to be granted privileges based on the organization they belong to. For example, a company may have a heating, ventilation and air conditioning (HVAC) division and a safety division. An employee of the company may be given access to oversee all connected thermostats, but not other wirelessly enabled products such as smoke and CO detectors belonging to the safety division. Using the access control manager, an OEM administrator can create a Thermostat Administrator role to grant thermostat administrators super-user like access to all the thermostat models that the company has in the field. The OEM administrator can also create a Thermostat Technician role with privileges to only view part of the data that a thermostat administrator can view. This flexibility allows for policies to be defined that follow a company's organizational structure.

Roles may also be created based on sales channels or distribution channels of an OEM. Many products sold through commercial channels are distributed through dealers. Examples are installations in commercial buildings, hospitals, or residences. The dealer typically performs the installation and has a maintenance contract with the customer. With this distribution model, there are many considerations. In some instances, the dealer should have enough access to a unit after installation that would allow for the dealer to monitor the installed systems (e.g., for maintenance, troubleshooting, technical assistance, etc.). In other instances the dealer may lose all access to a device after the device is installed in a customer's home and programmed. For example, the customer may want to limit how much of the data the dealer can access due to privacy or other considerations. Thus, the customer may control whether and how much access the dealer continues to have to the device after installation. Access control manager 205 may set up roles that satisfy these competing criteria. Thus, different sets of roles may be created and used for different distribution channels.

Roles may also be created based on retail distribution of devices manufactured by an OEM. In this model, products are purchased by customers directly from retailers. The customer may own a mix of devices from the same OEM, some purchased through a dealer and some from a retailer. In this case, the customer may want to access all owned devices from a single application, regardless of manufacturer. Access control manager supports a hierarchical model where the customer can access all owned devices regardless of manufacturer, where a dealer can only access allowed information on serviced devices, and where the OEM can access all devices manufactured by that OEM (but not by other manufacturers).

Figure 2C:
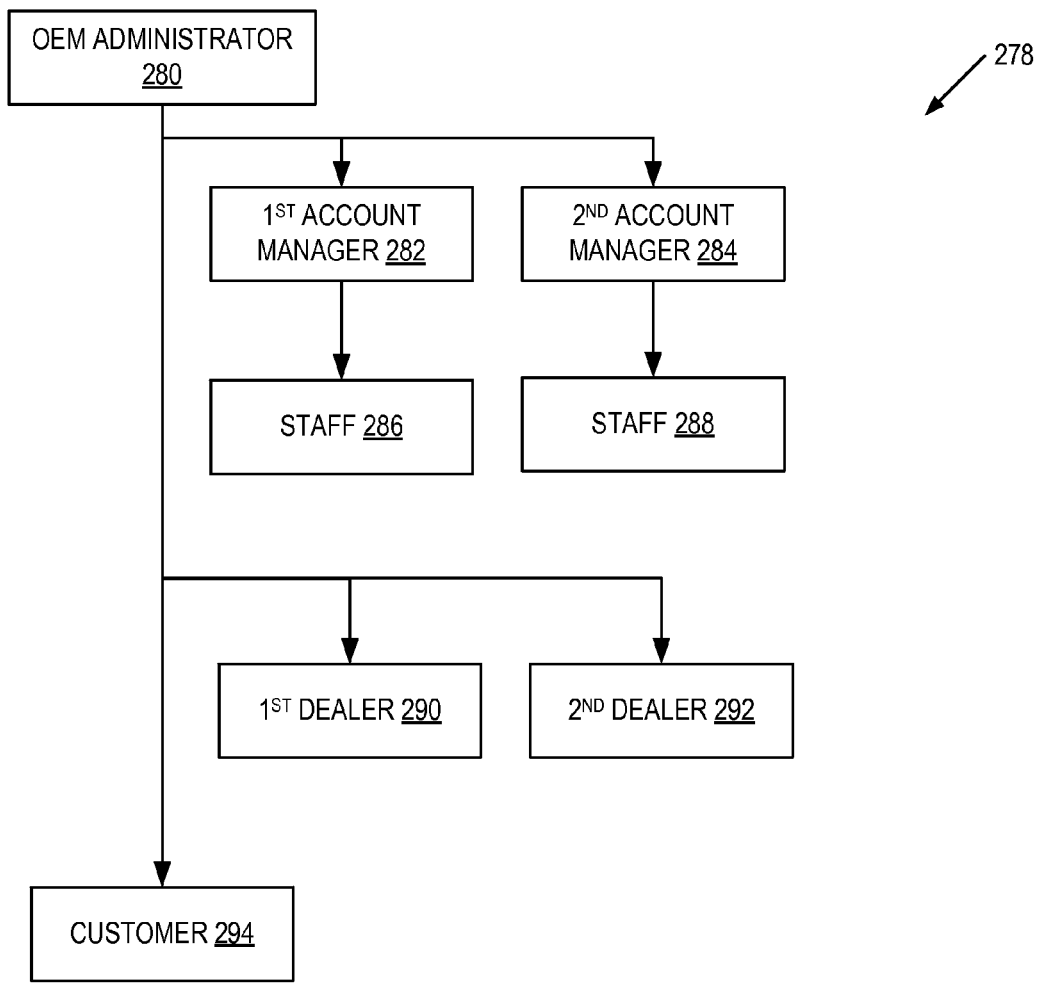
FIG. 2C illustrates an example role hierarchy for an OEM.

FIG. 2C illustrates an example role hierarchy 278 for an OEM. The role hierarchy 278 includes an OEM administrator role 280, multiple account manager roles 282, 284, multiple staff roles 286, 288, multiple dealer roles 290, 292 and a customer role 294. In other examples there may be more or fewer of any of these roles, some of the roles may not be used, and/or there may be other unmentioned roles.

In the example role hierarchy 278, OEM administrator 280 may have super-user privileges to all resources associated with an OEM. Alternatively, some privileges may be automatically revoked from the OEM administrator upon transfer of ownership of a device to a customer 294.

First account manager role 282 may have super-user privileges with regards to a particular product group of the OEM, and second account manager 284 may have super-user privileges with regards to a different product group. Thus, first account manager 282 may have access to all devices, customers, device templates, images, etc. of those devices that fall into the first product group, but may have no privileges with respect to devices, customers, device templates, images, etc. of those devices that fall into the second product group. Similarly, second account manager 284 may have access to all devices, customers, device templates, images, etc. of those devices that fall into the second product group, but may have no privileges with respect to devices, customers, device templates, images, etc. of those devices that fall into the first product group. The account managers may be able to view all devices in the field, help troubleshoot devices, review statistics on devices, and so on that relate to their product group.

The role hierarchy 278 may further include multiple staff roles 286, 288. The staff roles may be defined separately within each product group, or a single staff role may be applied generically across departments. Additionally, multiple different types of staff roles may be created within a particular product group. The staff roles may have specific privileges with regards to a subset of devices in a product group, for example.

The role hierarchy 278 may additionally include a first dealer role 290 and a second dealer role 292. The separate dealer roles 290, 292 may have privileges to access different subsets of devices from both the first product group and the second product group that have been installed by the dealers. Dealers may have privileges that enable them to install, set up and program devices for consumers, for example. Dealers may also retain privileges after device installation to enable them to troubleshoot and maintain installed devices.

The role hierarchy 278 further includes a customer role 294. The customer role is associated with an ultimate end-user that purchases a device from the OEM. The customer may be associated with an installed device or other resource in a few different ways. If a customer purchased the device from a store or had it installed by a dealer, the consumer may go through a registration method that may generate a new user account for the consumer and/or bind the device to the user account by setting the user account as the owner of the device. Once this happens, depending on the device itself, the customer will gain access to a subset of resources associated with that device. Alternatively, the dealer may designate a user account as an owner of a device as part of the installation process. Thus, the user may not need to take any actions to bind himself to the device.

A device may be associated with a dealer in a few ways as well. An owner of a device can designate a dealer for that user's device. This can enable the dealer to service the device. Alternatively, the dealer may be bound to the device before installation if, for example, the dealer performed the installation.

Referring back to FIG. 2A, authentication manager 210 manages user accounts. Each user account may include one or owned devices and/or devices being shared with the user account, one or more registered computing devices allowed to communicate with the devices, and one or more roles associated with the user account.

A user may attempt to log in to a user account by providing credentials (e.g., user name and password) to access control manager 205 from a computing device. Authentication module 210 verifies that the provided credentials match stored credentials for the user account. If the provided credentials match stored credentials for the user account, authentication module 210 invokes token generator 215.

Token generator 215 generates a token for the user and sends the token to the computing device of the user. The token may then be presented to any WAN accessible service of the IoT platform to gain access to resources. Responsive to the computing device presenting the token to a WAN accessible service, the WAN accessible service may use the token to check which role or roles are associated with the user account, and thus determine which resources the user account has access to as well as the type and level of access.

There are use cases that warrant sharing of a device among many users. An example is any device in a home being used by multiple family members. In this situation, a primary owner of the device shares it with the other family members or with a guest. In a more commercial setting, a hotel could have connected locks installed with access granted to hotel guests for a period of time. A receptionist may be able to, for example, activate access to a particular room of the hotel by temporarily assigning a role or tag to a user account of a guest for a given amount of time. Similarly, a home owner may grant temporary access to a guest to control a thermostat, lights, locks, etc. by granting a new role or tag to a user account of the guest.

Accordingly, users may wish to share access to their devices with friends, family, guests, clients, etc. Sharing module 225 enables such sharing. When a user wishes to share access to one or more resources, that user invokes sharing module 225 and identifies the resources to be shared and the user or user account with which the resources will be shared. The user may also specify the permissions to be granted, whether the sharing will be for a limited time period, and/or other conditions to place on the sharing. Sharing module 225 then updates the user account that will be receiving the sharing by adding the granted privileges to that user account. If sharing is to be for a limited time period, then the user may specify a time at which the sharing will begin and/or a time at which the sharing will terminate. Thus, temporary or permanent privileges can be granted and shared using the access control manager 205, and can be revoked at any time by the owner.

In some instances a user may wish to share resources (e.g., access to a device) to an individual who does not have a user account. In such an instance, sharing module 225 may generate a temporary account and associate the privileges with the temporary account. The user may provide an email address, phone number, or other contact information of the individual with whom the resources will be shared. Sharing module 225 may send a message to that individual using the provided contact information. The sent message may include a link or other information that the individual may use to activate and use the temporary account.

FIGS. 3-7 are flow diagrams showing various methods of managing roles in a IoT platform and of managing access to resources such as network-connected devices based on the roles. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a server computing device (e.g., server computing device 125 of FIG. 1).

Figure 3:
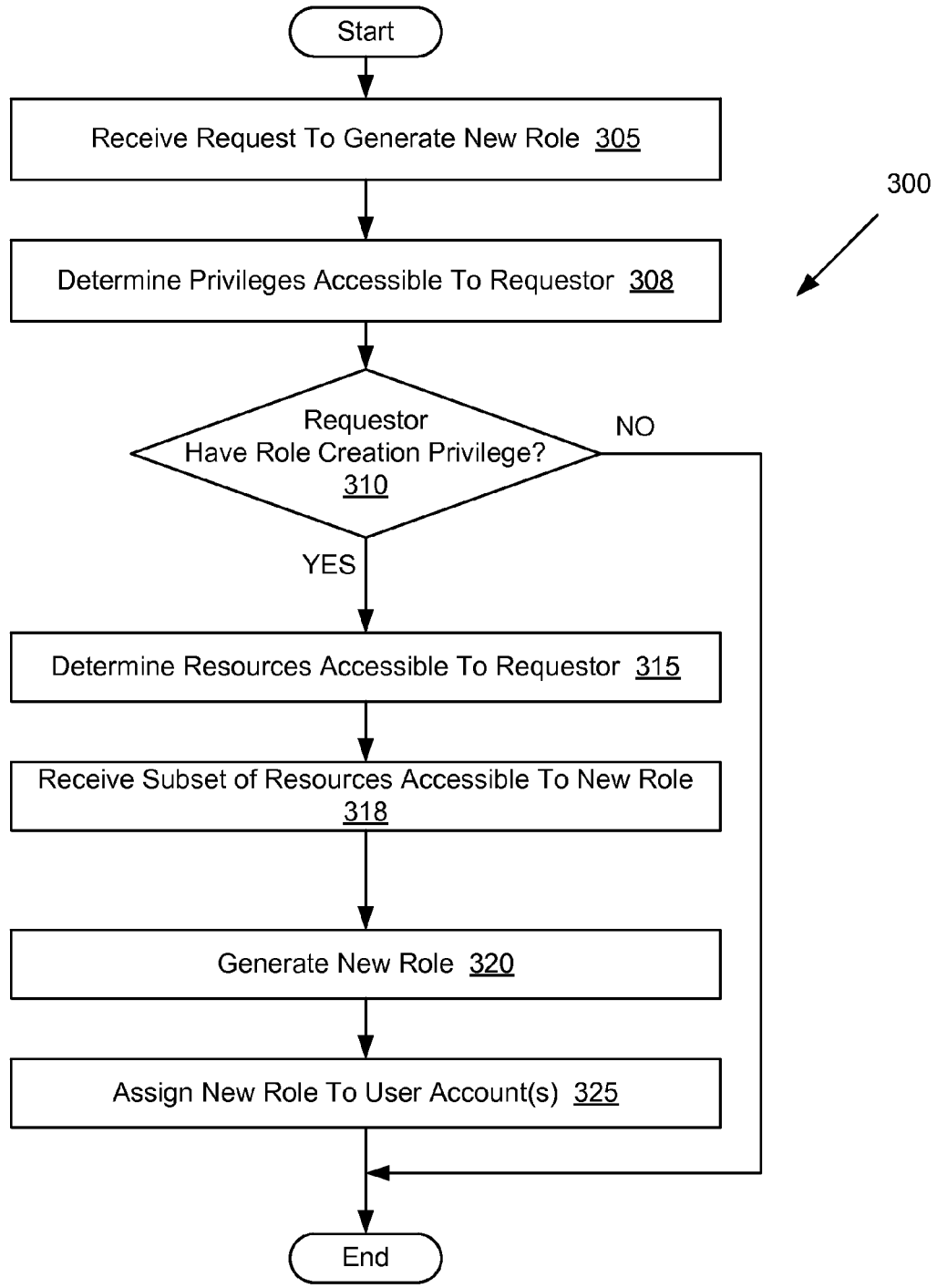
FIG. 3 is a flow chart of an example method of generating a new role for a network-connected device platform.

FIG. 3 is a flow chart of an example method 300 of generating a new role for a network-connected device platform (IoT platform). At block 305 of method 300, processing logic receives a request to generate a new role. At block 308, processing logic determines what privileges are available to the requestor. At block 310, processing logic determines whether the requestor has a privilege to create roles. If so, the method continues to block 315. Otherwise the method ends.

At block 315, processing logic determines resources available to the requestor. At block 318, processing logic determines a subset of these resources that will be accessible to the new role. The requestor may grant any of the privileges that the requestor has to the new role, up to and including role creation privileges. The requestor may also set up one or more criteria that must be satisfied before a role will gain access to a resource. These criteria may be implemented by assigning tags to the new role and potentially assigning corresponding or related tags to resources. In such an instance, a new role may gain access to a resource when a tag of the role matches an associated tag of the resource.

At block 320, the new role is created and added to a roles data structure. The role may be added to a role hierarchy under the creator. The creator may determine where in the role hierarchy the new role should be placed. Alternatively, the new role may be automatically arranged in the hierarchy with relation to other roles based on the privileges of the new role and privileges of the other roles.

At block 325, the new role may be assigned to one or more user accounts. These user accounts would then have all of the privileges associated with the new role.

Figure 4:
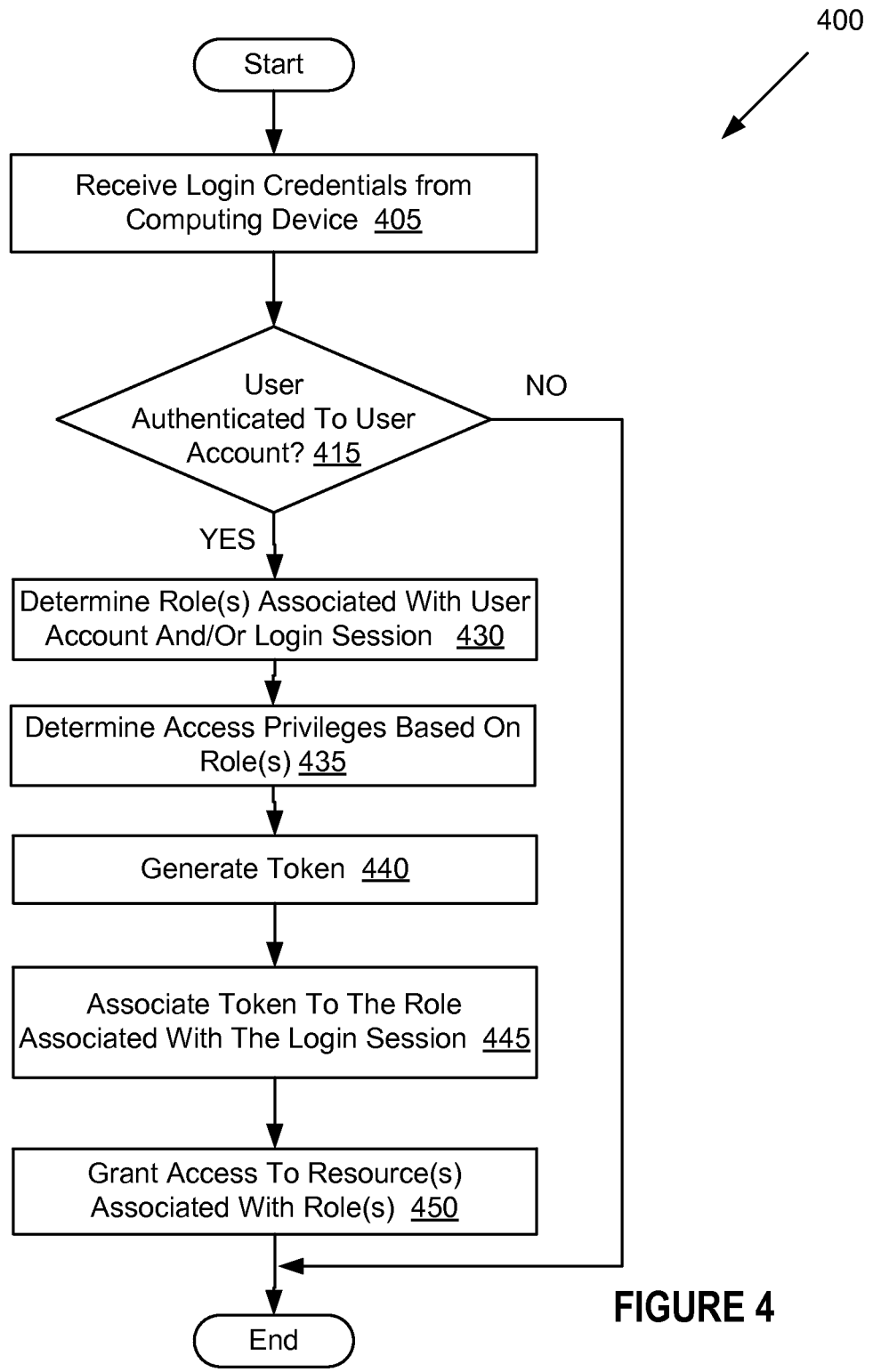
FIG. 4 is a flow chart of an example method of granting a token to a device that indicates a role associated with that device.

FIG. 4 is a flow chart of an example method 400 of granting a token to a device that is usable to determine a role associated with that device. At block 405 of method 400, processing logic receives login credentials from a computing device. At block 415, processing logic determines whether the provided login credentials are sufficient to authenticate a user (e.g., a computing device being used by the user) to a user account. If so, a login session is established and the method continues to block 430. Otherwise the method ends.

At block 430, processing logic determines one or more roles associated with the user account and/or with the current login session. At block 435, processing logic determines access privileges of the user account based on the roles. Each role may specify one or a set of privileges. Privileges may include access privileges to individual device resources or groups of device resources as well as access privileges to individual user resources or groups of user resources. In one embodiment in which a user account is associated with multiple roles, processing logic may prompt a user to select one of the multiple roles for a current login session. Processing logic may then receive a selection of a particular role.

At block 440, processing logic generates a token for the computing device. At block 445, processing logic associates the token with the role (or roles) associated with the login session. Processing logic may also provide the token to the computing device. In one embodiment, the token includes identifiers of the roles associated with the user account. Alternatively, the token may indicate actual access privileges of the user account. Alternatively, the token may include a unique identifier that is associated with the computing device and the user account during a session. Any system that is provided the token may perform a query to determine the roles and/or access privileges of the user account.

At block 450, processing logic grants to the computing device (and thus to the user of the computing device) access to the determined resources associated with the determined roles. The method then ends.

Figure 5:
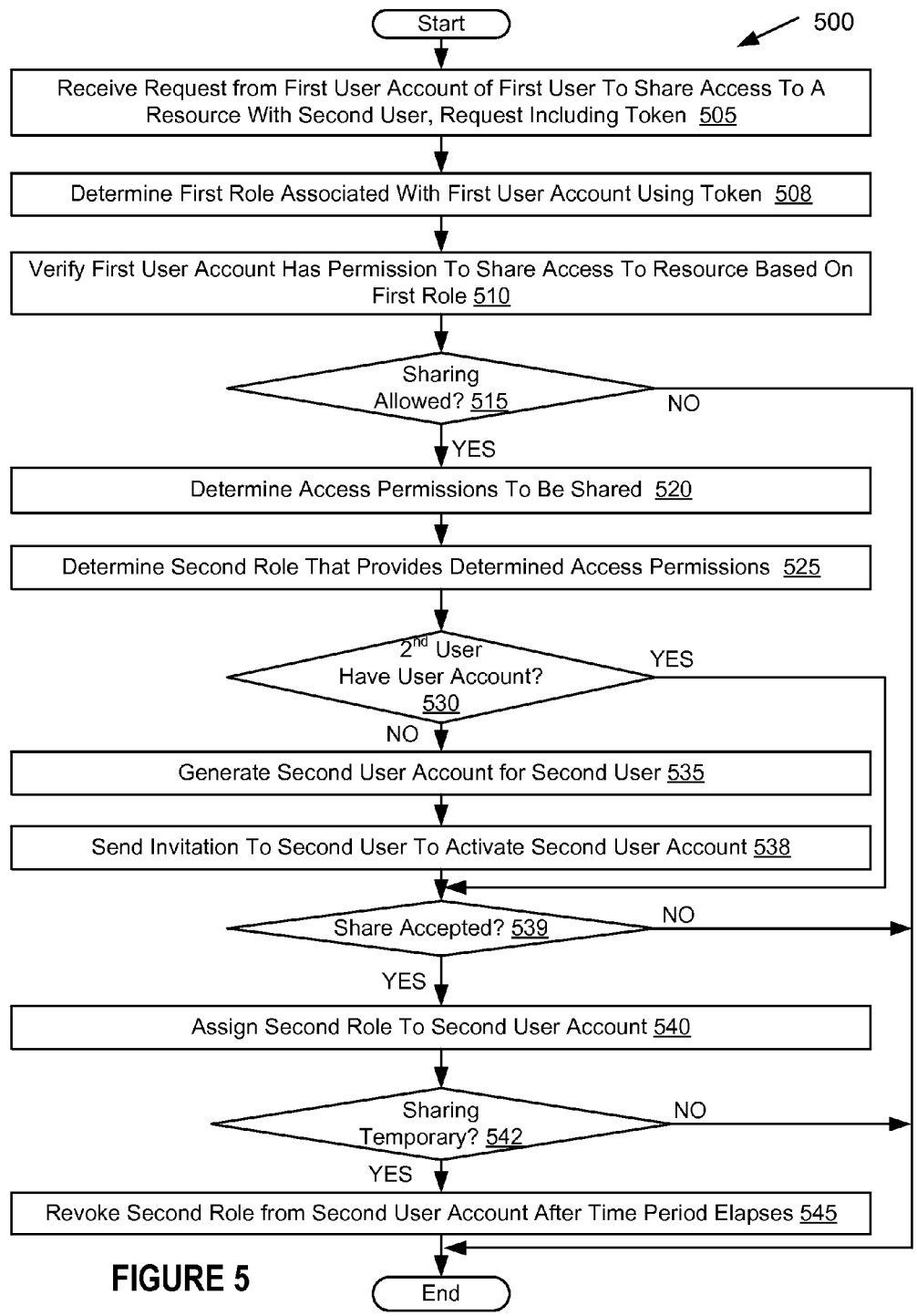
FIG. 5 is a flow chart of an example method of sharing access to a network-connected device.

FIG. 5 is a flow chart of an example method 500 of sharing access to a network-connected device. At block 505 of method 500, processing logic receives a request from a first user account of a first user to share access to a resource with a second user. The request may include a token associated with the first user account.

At block 508, processing logic determines a first role associated with the first user account using the provided token. At block 510, processing logic verifies the first user account has permission to share access to the privilege based on the first role. At block 515 if sharing of the resource is allowed, the method continues to block 520. If at block 515 sharing of the resource is not allowed, the method ends.

At block 520, processing logic determines access permissions that are to be shared. In one embodiment, processing logic provides a drop down menu or other graphical representation of all the sub-resources (e.g., settings, parameters, views, etc.) of the resource that may be shared. A user may select the entire resource to share or may select individual sub-resources to be shared. For each sub-resource that is to be shared, the user may select the type of access that is to be shared (e.g., view access, control access, etc.) and/or place conditions on the sharing. These conditions may be enforced by adding tags to a role of the user account with which privileges are being shared and/or by adding tags to the resources.

At block 525, processing logic determines a second role associated with the determined access permissions. If there is an existing role that includes these privileges, then this role may be used. If there is not an existing role that includes the particular combination of privileges that have been selected, then a new role may be generated.

At block 530, processing logic determines whether the second user has a user account. If so, the method proceeds to block 539. If the second user does not have a user account, the method continues to block 535 and processing logic generates a second user account for the second user. The generated account may be a temporary account. At block 538, processing logic sends an invitation to the second user to activate the second user account.

At block 539, processing logic determines whether the second user accepts the sharing request. In one embodiment, the second role does not become active or become associated with the user account of the second user until the second user has explicitly accepted to receive the share. The receiver, in this case, has the authority to accept or reject a share that has been granted to him. If the share is accepted, the method continues to block 540. If the share is declined, the method ends.

At block 540, processing logic assigns the second role to the second user account. At block 542, processing logic determines whether the sharing is to be temporary. If the sharing is to be temporary, then at block 545 processing logic eventually revokes the second role from the second user account after a time period elapses. If the sharing is not temporary, the method ends.

At any time the first user may actively revoke the second role from the second user account. The user may navigate to a sharing window of a WAN accessible service. The sharing window may show all of the user accounts with which access to one or more resources has been shared. The first user may select any of these other user accounts and request that sharing be terminated. Responsive to such a command, processing logic may update the other user accounts by terminating the privileges that had been shared.

Figure 6:
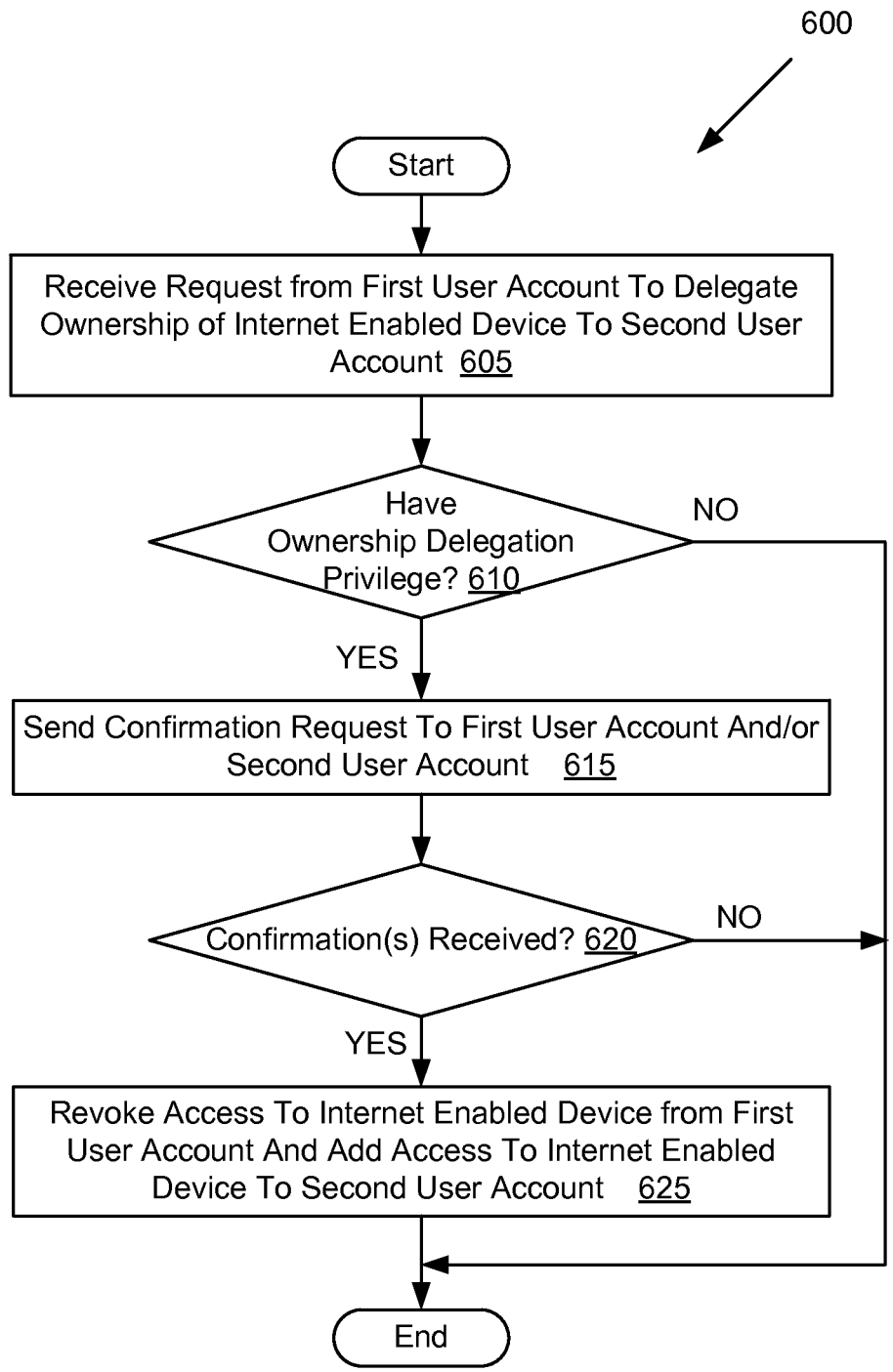
FIG. 6 is a flow chart of an example method of transferring ownership of a network-connected device.

FIG. 6 is a flow chart of an example method 600 of transferring ownership of a network-connected device. At block 605 of method 600, processing logic receives a request from a first user account to delegate (transfer) ownership of a network connected device (e.g., an Internet enabled device) from the first user account to a second user account. At block 610, processing logic determines whether the first user account has an ownership delegation privilege. The first user account may have ownership delegation privileges if the first user account has an owner role for the device. If the first user account has the owner role, the method continues to block 615. Otherwise the method ends.

At block 615, processing logic sends confirmation requests to the first user account and/or to the second user account. At lock 620, processing logic determines whether confirmations have been received. If all confirmation requests were responded to with a confirmation, the method continues to block 625 and ownership of the device is transferred between the user accounts. This involves revoking access to the network connected device from the first user account and adding access to the network connected device to the second user account. In one embodiment, an owner role for the device is added to the second user account and revoked from the first user account. If at block 620 one or more confirmations have not been received, the method ends without transferring ownership of the network connected device.

Figure 7:
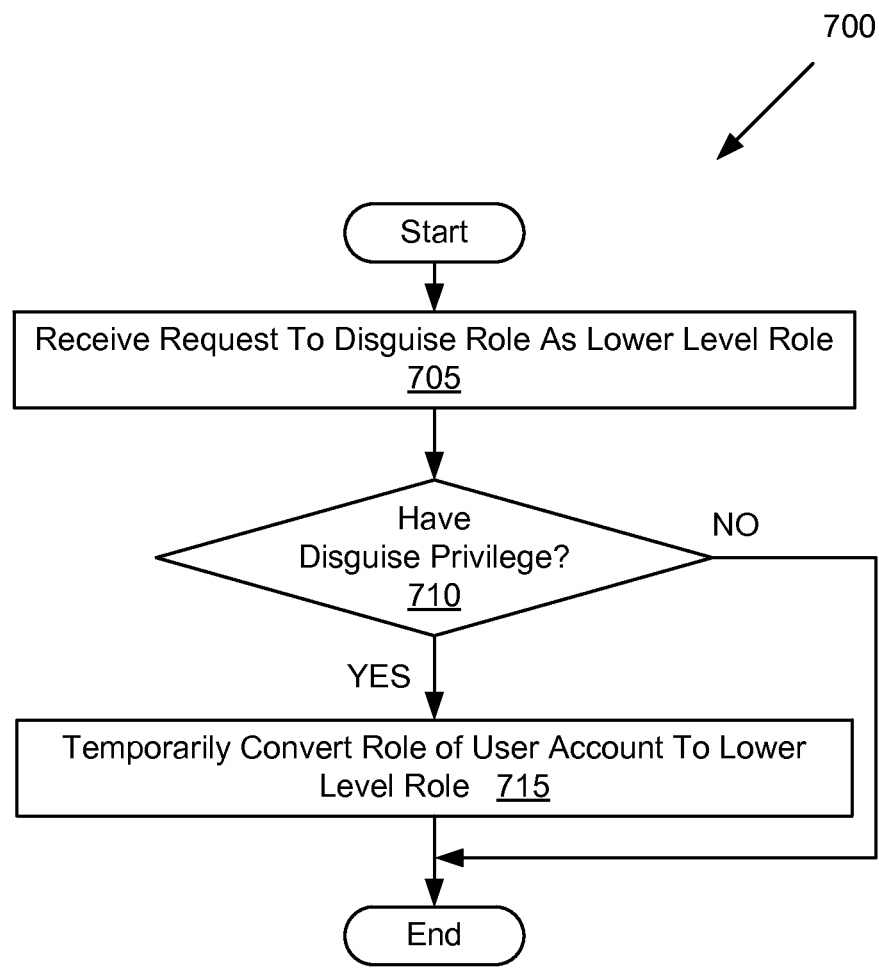
FIG. 7 is a flow chart of an example method of disguising a role in a network-connected device platform as another lower level role.

FIG. 7 is a flow chart of an example method 700 of disguising a role in a network-connected device platform as another lower level role. At block 705, processing logic receives a request to disguise a role as a lower level role. At block 710, processing logic determines whether the role has a disguise privilege. If so, the method continues to block 715. Otherwise the method ends.

At block 715, processing logic temporarily converts the role of the user account to a lower level role that has fewer privileges. In one embodiment, the user account has the lower level role for the duration of a session. To revert back to the original role a user may terminate a session and then log back in to establish a new session. Alternatively, a time limit may be associated with the disguise. In such an embodiment, the role of the user account may revert back to the original role after the time limit elapses.

By disguising a role as a lower level role, a user may test scenarios from the lower level role. Thus, disguising a role as a lower level role may be useful for bug checking, error checking, trouble shooting, and providing technical assistance to customers. Alternatively, a user may have multiple different roles associated with the same resource or set of resources. The user may switch between these roles based on a level of access that the user needs at a given time.

Figure 8:
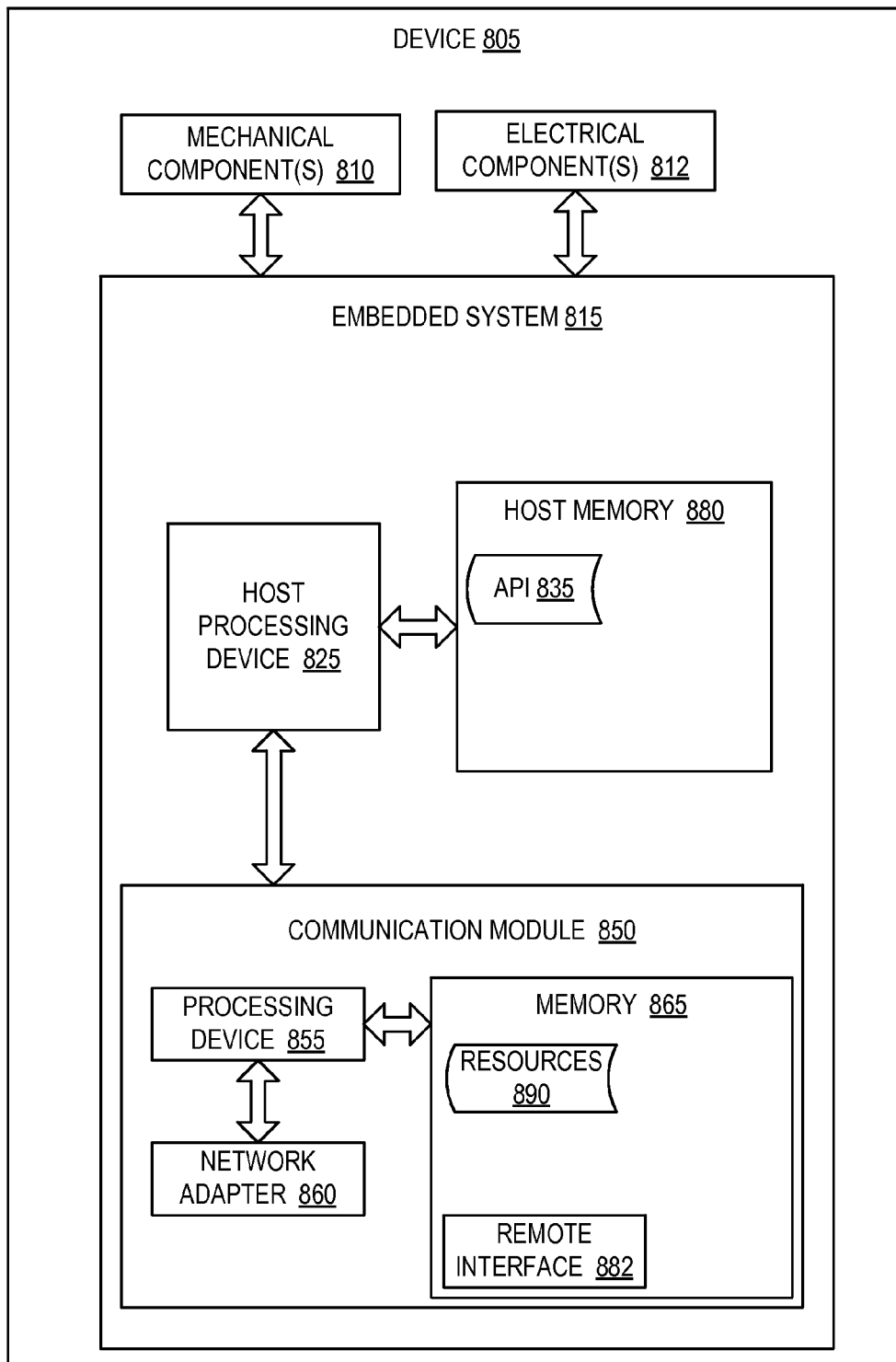
FIG. 8 is a block diagram of an example device having a remotely accessible embedded system.

FIG. 8 is a block diagram of an example device 805 having a remotely accessible embedded system 815. The device may include any of the aforementioned types of devices having an embedded system, and in one embodiment corresponds to a device 135A-E of FIG. 1. In one embodiment, the device 805 includes mechanical components 810, electrical components 812 and an embedded system 815. The electrical components 812 and/or mechanical components 810 may include sensors, programmable logic controllers (PLCs), switches, motors, valves, actuators, and so forth.

The embedded system 815 may include a host processing device 825, a host memory 830 and/or a communication module 850 coupled to the host processing device 825. The embedded system 815 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 825 may be a microcontroller or a digital signal processor (DSP) in one embodiment. Host processing device 825 may alternatively or additionally include a programmable logic controller (PLC), a field programmable gate array (FPGA) or a complex programmable logic device (CPLD). The host processing device 825 may be configured to perform specific functions related to the operation and control of the device 805.

Host memory 830 may include random access memory (RAM), read only memory (ROM), one time programmable (OTP) ROM, Flash (e.g., NOR Flash), or other types of memory. Host memory 830 may store an application programming interface (API) 835 for the communication module 850. The API 835 may enable the host processing device 825 to send commands and/or data to and receive commands and/or data from communication module 850. Host memory 830 may also include firmware for the host processing device 825 that configures the host processing device to perform one or more operations that are specific to device 805.

In some embodiments, the host memory 830 may be integrated into the host processing device 825. For example, microcontrollers typically include a processor core, memory and programmable input/output peripherals. Accordingly, if the host processing device 825 is a microcontroller, then host memory 830 may be a memory of host processing device 825.

Communication module 850 may be an integrated circuit (IC) that is configured to be coupled to host processing device 825 of embedded system 815. Communication module 850 may be provided by a third party to a manufacturer of the device along with the API 835, and may enable network capability and remote control capability to be easily added to the device 805. The communication module 850 may include its own processing device 855, a memory 865 and/or a network adapter 860. The processing device 855 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 865 is integrated into processing device 855.

Memory 865 may store data identifying one or more resources 890 (e.g., parameters, attributes and data) of the device 805 that may be accessible to various roles. Memory 865 may also store firmware for the processing device 855, such as firmware that includes instructions for a remote interface 882.

Network adapter 855 may be a wired network adapter (e.g., an Ethernet adapter) or a wireless network adapter (e.g., a Wi-Fi adapter or other wireless local area network (WLAN) adapter). Network adapter 860 may also be configured to provide connection to a network or other devices using Zigbee, PLC, Bluetooth, 6LowPAN, or other communication protocols. Network adapter 860 may receive notifications and other messages from a WAN accessible service and/or remote control applications. Network adapter 860 may additional send outgoing messages to the WAN accessible service and/or to remote control applications.

For session establishment, remote interface 882 may generate session keys for a new session with the remote control interface. In one embodiment, remote interface 882 may receive a token from a remote control application. Remote interface 880 may determine which of the resources 890 the remote control application has privileges for based on the token. In one embodiment, the token includes identification of one or more roles and/or resource permissions. Alternatively, remote interface 882 may query a WAN accessible service to determine what privileges are available to the remote control application. Remote interface 882 may send the token to the WAN accessible service and receive back an indication of the resource permissions. Once remote interface 882 has determined the resource access privileges of the remote control application, remote interface 882 may provide information to the remote control application and/or receive an execute commands from the remote control application in accordance with the access privileges.

Figure 9:
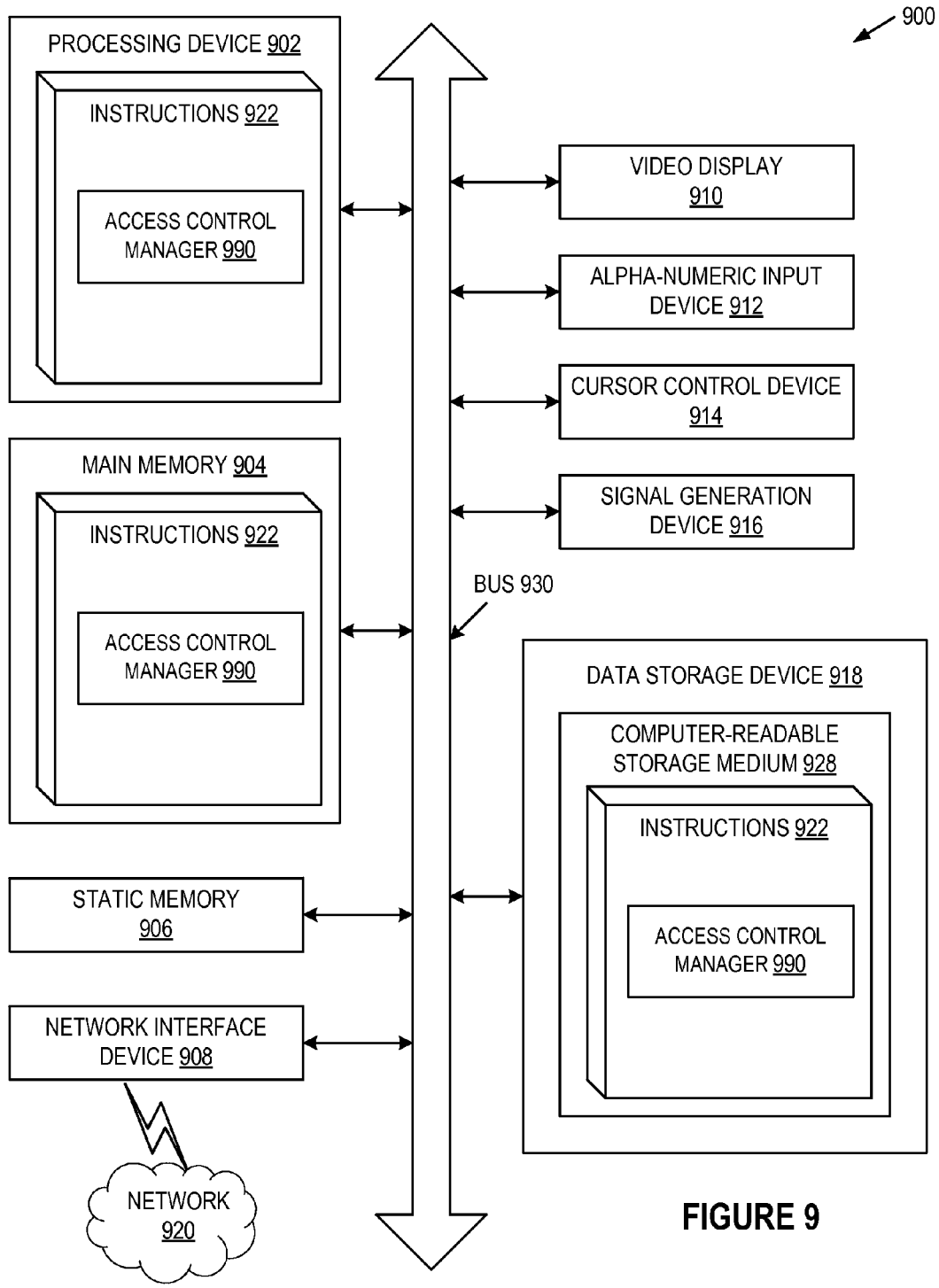
FIG. 9 illustrates a block diagram of one embodiment of a computing device.

FIG. 9 illustrates a diagrammatic representation of a machine in the example form of a computing device 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-readable storage medium (or more specifically a computer-readable storage medium) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The computer-readable storage medium 928 may also be used to store an access control manager 990 (as described with reference to FIG. 2A), and/or a software library containing methods that call an access control manager 990. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2A) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "authenticating", "determining", "providing", "granting", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
  authenticating, by a processing device, a first user to a first user account based on first received credentials;
  determining, by the processing device, a first role associated with the first user account, wherein the first role is an original equipment manufacturer (OEM) role;
  determining first access permissions to one or more resources based on the first role, the one or more resources comprising a network-connected device comprising an embedded system configured to perform one or more functions for the network-connected device, the embedded system comprising a communication module that enables that embedded system to connect to a network, wherein the first access permissions comprise permissions to view data from the network-connected device;
  granting to the first user access to view the data from the network-connected device based on the first access permissions;

authenticating a second user to a second user account based on second received credentials;
determining a second role associated with the second user account, wherein the second role is an end-user role;
determining second access permissions to the one or more resources based on the second role, wherein the second access permissions comprise permissions to control the network-connected device; and
granting to the second user access to control the network-connected device based on the second access permissions.

2. The method of claim 1, further comprising:
generating a token for a computing device of the first user; and
transmitting the token to the computing device, wherein the computing device is to provide the token to a service to gain access to view the data from the network-connected device.

3. The method of claim 1, wherein the one or more resources further comprise at least one of firmware images for the network-connected device or additional users.

4. The method of claim 1, wherein the permissions to control the network-connected device comprise permissions to change settings on the network-connected device and permissions to program the network-connected device.

5. The method of claim 1, wherein at least one of the one or more resources comprises a hierarchy of sub-resources, and wherein at least one of the first role or the second role controls access to each of the sub-resources in the hierarchy.

6. The method of claim 1, further comprising:
receiving a request to share access to the network-connected device with an additional user from the second user;
determining that the second user account has permission to share the access to the network-connected device based on the second role; and
assigning a new role to an additional user account of the additional user responsive to determining that the second user account has the permission to share the access to the network-connected device, wherein the new role provides access to control the network-connected device.

7. The method of claim 6, wherein the request comprises a time limit that is associated with the new role, the method further comprising:
responsive to the time limit elapsing, revoking the new role from the additional user account of the additional user.

8. The method of claim 6, further comprising:
generating the additional user account responsive to determining that the additional user lacks a user account; and
sending an invitation to the additional user to activate the additional user account.

9. The method of claim 1, wherein at least one of the first role or the second role is associated with a particular environment, the method further comprising:
granting the first access permissions to the one or more resources while the one or more resources are associated with the particular environment; and
revoking the first access permissions to the one or more resources while the one or more resources are not associated with the particular environment, wherein the particular environment comprises one of a residential environment, an enterprise environment or a commercial environment.

10. The method of claim 1, further comprising:
receiving a request to disguise at least one of the first role or the second role as a lower level role having fewer permissions; and
temporarily converting at least one of the first role or the second role into the lower level role.

11. The method of claim 1, wherein the first user account is associated with a plurality of roles, and wherein determining the first role associated with the first user account comprises receiving a selection of the first role from the plurality of roles, the method further comprising:
generating a token for a current login session that identifies the particular first role.

12. The method of claim 1, wherein the second user is an owner of the network-connected device, the method further comprising:
receiving a command to transfer ownership of the network-connected device to an additional user account;
sending a request for confirmation to at least one of the second user account or the additional user account; and
responsive to receiving the confirmation, revoking access to the network-connected device from the second user account and adding access to the network-connected device to the additional user account.

13. The method of claim 1, further comprising:
receiving a request to generate the second role;
receiving an input of the one or more resources to which the second access permissions will be granted;
generating the second role; and
associating the second role with the second user account responsive to the second user account satisfying a criterion associated with the second role.

14. A non-transitory computer readable storage medium having instructions that, when executed by a processing device, cause the processing device to perform operations comprising:
authenticating, by the processing device, a first computing device of a first user to a first user account based on first credentials;
determining, by the processing device, a first role associated with the first user account, wherein the first role is an original equipment manufacturer (OEM) role;
determining first access permissions to one or more resources based on the first role, the one or more resources comprising a network-connected device comprising an embedded system configured to perform one or more functions for the network-connected device, the embedded system comprising a communication module that enables the embedded system to connect to a network, wherein the first access permissions comprise permissions to view data from the network-connected device;
granting to the first computing device access to view the data from the network-connected device based on the first access permissions;
authenticating a second computing device of a second user to a second user account based on second credentials;
determining a second role associated with the second user account, wherein the second role is an end-user role;
determining second access permissions to the one or more resources based on the second role, wherein the second access permissions comprise permissions to control the network-connected device; and
granting to the second computing device access to control the network-connected device based on the second access permissions.

15. The non-transitory computer readable storage medium of claim 14, wherein the permissions to control the network-connected device comprise permissions to change settings on the network-connected device and permissions to program the network-connected device.

16. The non-transitory computer readable storage medium of claim 14, the operations further comprising:
receiving a request from the second computing device to share access to the network-connected device with an additional user from the second user;
determining that the second user account has permission to share the access to the network-connected device based on the second role; and
assigning a new role to an additional user account of the additional user responsive to determining that the second user account has the permission to share the access to the network-connected device, wherein the new role provides access to control the network-connected device.

17. The non-transitory computer readable storage medium of claim 16, wherein the request comprises a time limit that is associated with the new role, the operations further comprising:
responsive to the time limit elapsing, revoking the new role from the additional user account of the additional user.

18. The non-transitory computer readable storage medium of claim 14, wherein the network-connected device is owned by the second user, the operations further comprising:
receiving a command to transfer ownership of the network-connected device to an additional user account;
sending a request for confirmation to at least one of the second user account or the additional user account; and
responsive to receiving the confirmation, revoking access to the network-connected device from the second user account and adding access to the network-connected device to the additional user account.

19. The non-transitory computer readable storage medium of claim 14, the operations further comprising:
receiving a request to generate the second role;
receiving an input of the one or more resources to which the second access permissions will be granted;
generating the second role; and
associating the second role with the second user account responsive to the second user account satisfying a criterion associated with the second role.

20. A computing device comprising:
at least one data store to store first data regarding a plurality of user accounts, second data regarding a plurality of resources and third data regarding a plurality of roles, wherein the plurality of resources comprise a plurality of network-connected devices, wherein each of the plurality of roles has access privileges to a subset of the plurality of resources, and wherein each of the plurality of user accounts is associated with at least one of the plurality of roles; and
a hardware processor, connected with the at least one data store, to:
authenticate a computing device of a first user to a first user account of the plurality of user accounts based on first credentials;
determine a first role of the plurality of roles that is associated with the first user account, wherein the first role is an original equipment manufacturer (OEM) role;
determine first access permissions to one or more resources of the plurality of resources based on the first role, the one or more resources comprising a network-connected device of the plurality of network-connected devices that comprises an embedded system configured to perform one or more functions for the network-connected device, the embedded system comprising a communication module that enables the embedded system to connect to a network, wherein the first access permissions comprise permissions to view data from the network-connected device;
grant to the first user access to view the data from the network-connected device based on the first access permissions;
authenticate a second user to a second user account of the plurality of user accounts based on second credentials;
determine a second role of the plurality of roles that is associated with the second user account, wherein the second role is an end-user role;
determine second access permissions to the one or more resources based on the second role, wherein the second access permissions comprise permissions to control the network-connected device; and
grant to the second user access to control the network-connected device based on the second access permissions.

* * * * *